(12) United States Patent
Heap et al.

(10) Patent No.: US 8,335,623 B2
(45) Date of Patent: Dec. 18, 2012

(54) METHOD AND APPARATUS FOR REMEDIATION OF AND RECOVERY FROM A CLUTCH SLIP EVENT IN A HYBRID POWERTRAIN SYSTEM

(75) Inventors: Anthony H. Heap, Ann Arbor, MI (US); Lawrence A. Kaminsky, Sterling Heights, MI (US); Jy-Jen F. Sah, West Bloomfield, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 810 days.

(21) Appl. No.: 12/247,279

(22) Filed: Oct. 8, 2008

(65) Prior Publication Data

US 2009/0112427 A1  Apr. 30, 2009

Related U.S. Application Data

(60) Provisional application No. 60/982,458, filed on Oct. 25, 2007.

(51) Int. Cl.
  *G06F 17/00* (2006.01)
  *B60K 6/20* (2007.10)
(52) U.S. Cl. ..................... 701/67; 180/65.21
(58) Field of Classification Search .............. 701/22, 701/35, 208, 211, 213, 300, 67; 180/65.1–65.8; 340/995.1, 995.19; 903/903
See application file for complete search history.

(56) References Cited

U.S. PATENT DOCUMENTS

| | | | |
|---|---|---|---|
| 5,807,209 A * | 9/1998 | Matsubara et al. | 477/176 |
| 5,890,994 A * | 4/1999 | Sawamura et al. | 477/181 |
| 6,832,148 B1 | 12/2004 | Bennett | |
| 6,868,318 B1 | 3/2005 | Cawthorne | |
| 7,154,236 B1 | 12/2006 | Heap | |
| 2004/0049328 A1* | 3/2004 | Lee | 701/22 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |

(Continued)

FOREIGN PATENT DOCUMENTS

EP  1710462  * 10/2006

(Continued)

*Primary Examiner* — James Trammell
*Assistant Examiner* — Muhammad Shafi

(57) ABSTRACT

A method for operating a powertrain, including an electro-mechanical transmission mechanically-operatively coupled to an internal combustion engine and an electric machine, includes monitoring slip across a selectively applied clutch within the transmission to indicate a clutch slip event, and if the monitoring indicates the clutch slip event decreasing a load across the selectively applied clutch by reducing torque of at least one of the engine and the electric machine, in order to reduce the slip, thereby ending the clutch slip event.

18 Claims, 5 Drawing Sheets

U.S. PATENT DOCUMENTS

| | | |
|---|---|---|
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0275823 A1* | 11/2007 | Motosugi et al. ............. 477/176 |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |

| | | |
|---|---|---|
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |

FOREIGN PATENT DOCUMENTS

EP 1710462 A1 10/2006

\* cited by examiner

METHOD AND APPARATUS FOR REMEDIATION OF AND RECOVERY FROM A CLUTCH SLIP EVENT IN A HYBRID POWERTRAIN SYSTEM

CROSS REFERENCE TO RELATED APPLICATIONS

This application claims the benefit of U.S. Provisional Application No. 60/982,458 filed on Oct. 25, 2007 which is hereby incorporated herein by reference.

TECHNICAL FIELD

This disclosure pertains to control systems for electromechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electromechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

Operation of the above devices within a hybrid drive vehicle require management of numerous torque bearing shafts or devices representing connections to the above mentioned engine, electrical motors, and driveline. Various control schemes and operational connections between the various aforementioned components of the hybrid drive system are known, and the control system must be able to engage and disengage the various components in order to perform the functions of the hybrid drive system. Engagement and disengagement is known to be accomplished through the use of a transmission employing clutches. Clutches are devices well known in the art for engaging and disengaging shafts including the management of rotational velocity and torque differences between the shafts. Engagement or locking, disengagement or unlocking, operation while engaged or locked operation, and operation while disengaged or unlocked operation are all clutch states that must be managed in order for the vehicle to operate properly and smoothly.

Implications to vehicle operation related to perceptible jerks or abrupt changes to vehicle acceleration are collectively described as drivability. One source of perceptible jerks affecting drivability is slip, or relative rotational movement between the connective surfaces of a clutch. Slip occurs whenever the reactive torque transmitted through the clutch exceeds the actual torque capacity created by the applied clamping force. Clutches can be designed to operate with some level of controlled slip in asynchronous operation, or clutches can be designed to operate with little or preferably no slip in synchronous operation. This disclosure deals with clutches designed primarily for synchronous operation. Slip in a transmission in synchronous operation results in unintended loss of control within the transmission and adverse affects to drivability. Another source of perceptible jerks affecting drivability results from changes in torque from torque generative devices. Input torque from the engine and input torque from the electric machine or electric machines in a hybrid powertrain can be applied individually or cooperatively to provide output torque. However, changes in total input torque required to meet torque demand, for instance, due to a change in operator pedal position or due to a transmission operating range state shift, must be handled smoothly. Particularly difficult to manage are input torques, applied simultaneously to a transmission, with different reaction times to a control input. Based upon a single control input, the various devices can change respective input torques at different times, causing increased abrupt changes to the overall torque applied through the transmission. Abrupt and uncoordinated changes to the various input torques transmitted through a transmission can cause unnecessary perceptible changes in acceleration or jerks in the vehicle, which can adversely affect vehicle drivability.

Clutches are known in a variety of designs and control methods. One known type of clutch is a mechanical clutch operating by separating or joining two connective surfaces, for instance, clutch plates, operating, when joined, to apply frictional torque to each other. One control method for operating such a mechanical clutch includes applying a hydraulic control system implementing fluidic pressures transmitted through hydraulic lines to exert or release clamping force between the two connective surfaces. Operated in this way, the clutch is not operated in a binary manner, but rather is capable of a range of engagement states, from fully disengaged and desynchronized, to synchronized with no clamping force applied, to engaged but with only minimal clamping force, to engaged with some maximum clamping force. The capacity of the clutch to transmit reactive torque is a function of the magnitude of the clamping force applied to the clutch. This variable control of clutches allows for smooth transition between locked and unlocked states and also allows for managing slip in a locked transmission.

A method to operate a powertrain comprising containing slip events by modulating input torques to the transmission would improve vehicle drivability.

SUMMARY

A method for operating a powertrain, including an electromechanical transmission mechanically-operatively coupled to an internal combustion engine and an electric machine adapted to selectively transmit mechanical power to an output member, includes monitoring slip across a selectively applied clutch within the transmission to indicate a clutch slip event, and if the monitoring indicates the clutch slip event decreasing a load across the selectively applied clutch by reducing at least one of a magnitude of torque permitted from the engine and a magnitude of torque permitted from the electric machine, in order to reduce the slip, thereby ending the clutch slip event.

BRIEF DESCRIPTION OF THE DRAWINGS

One or more embodiments will now be described, by way of example, with reference to the accompanying drawings, in which.

DETAILED DESCRIPTION

Figure 1:
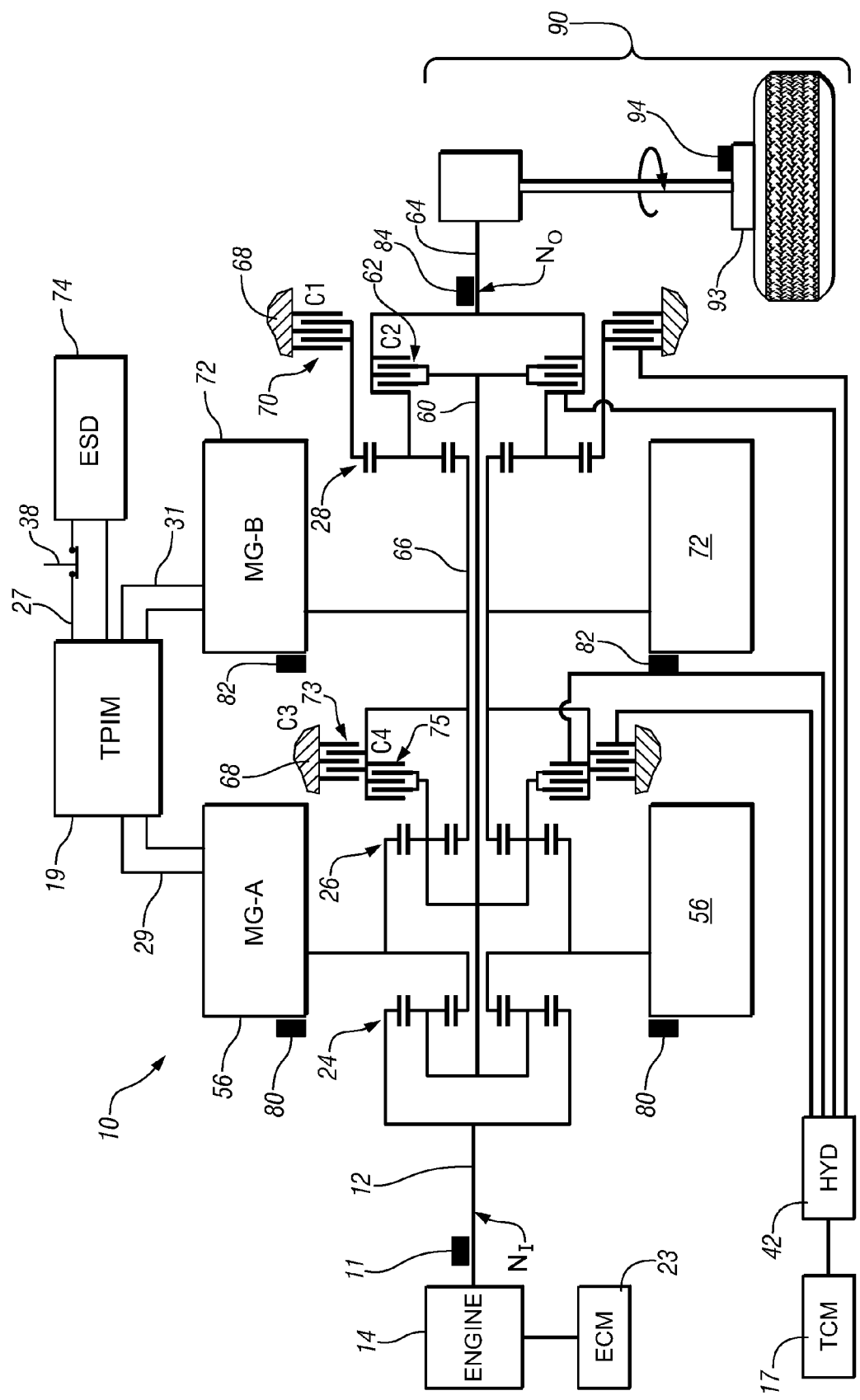
FIG. 1 is a schematic diagram of an exemplary powertrain, in accordance with the present disclosure.
Figure 2:
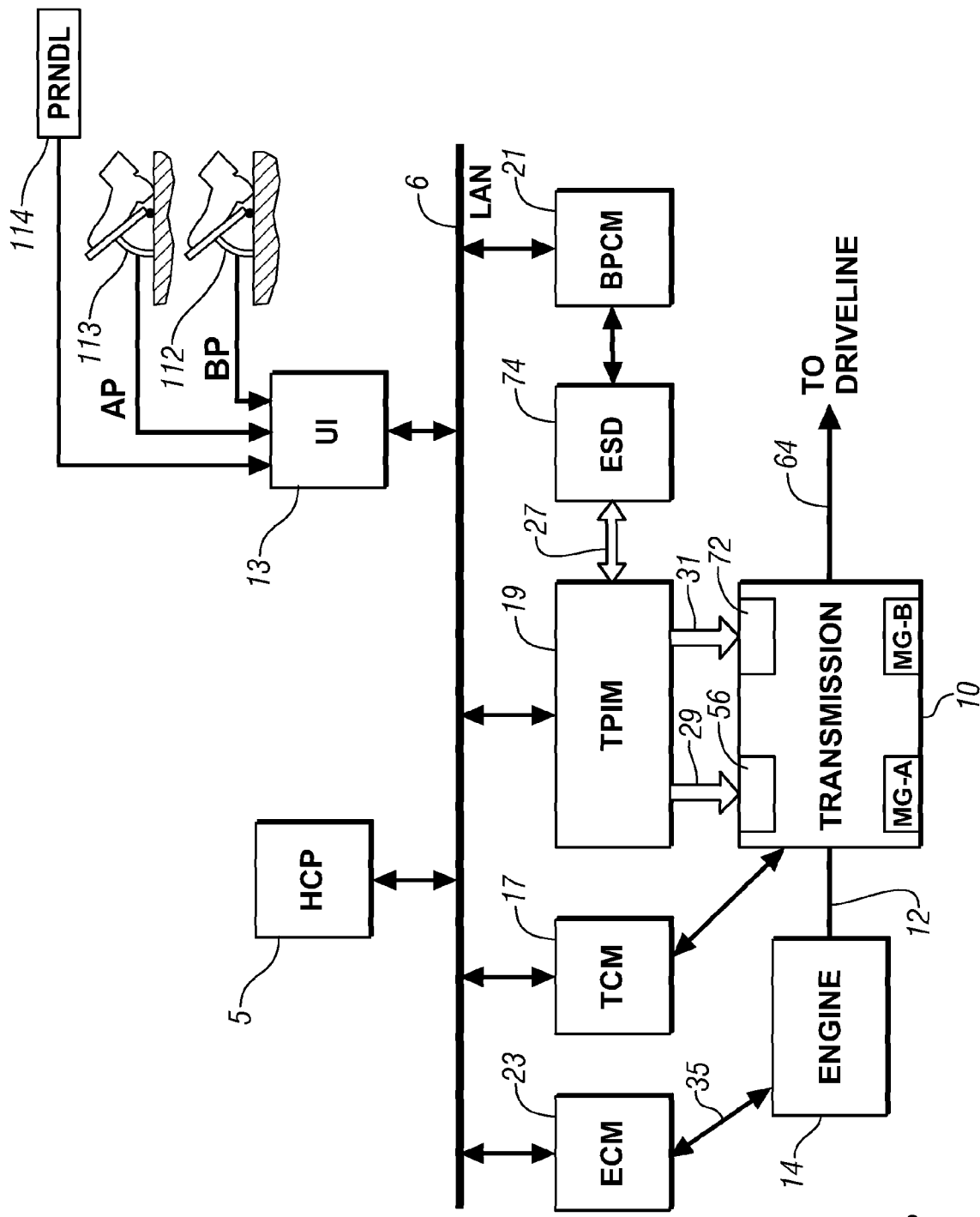
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain in accordance with the present disclosure is depicted in FIG. 1, comprising a two-mode, compound-split, electromechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS-WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

The exemplary powertrain selectively operates in one of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| MI_Eng_Off | OFF | EVT Mode I | C1 70 | |
| MI_Eng_On | ON | EVT Mode I | C1 70 | |
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | EVT Mode II | C2 62 | |
| MII_Eng_On | ON | EVT Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to "ground" the outer gear member of the third planetary gear set 28. The engine state can be one of ON ('MI_Eng_On') or OFF ('MI_Eng_Off'). A second continuously variable mode, i.e., EVT Mode II, or MII, is selected by applying clutch C2 62 only to connect the shaft 60 to the carrier of the third planetary gear set 28. The engine state can be one of ON ('MII_Eng_On') or OFF ('MII_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$, is achieved. A first fixed gear operation ('FG1') is selected by applying clutches C1 70 and C4 75. A second fixed gear operation ('FG2') is selected by applying clutches C1 70 and C2 62. A third fixed gear operation ('FG3') is selected by applying clutches C2 62 and C4 75. A fourth fixed gear operation ('FG4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O-REQ}$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transmit power therebetween to generate a power flow to the output member 64.

As mentioned above, clutch slip is an event which occurs when the load or torque applied across a clutch exceeds an actual torque capacity of the clutch. The torque applied overcomes the static frictional forces between the connective surfaces of the clutch, and the connective surfaces rotate relative to each other. One method to avoid clutch slip is to modulate the clamping force available to the clutch control mechanism, where a greater clamping force results in a greater actual torque capacity. However, increasing available clamping force, for example, by boosting pressure to a hydraulic clutch control system, has limitations. For example, electric motor torque can change more quickly than hydraulic pressure can be boosted, and a large change in electric motor torque in a short period of time could result in the motor torques exceeding the actual torque capacity at the existing hydraulic pressure. Also, abrupt changes in forces acting upon the driveline can cause slip events. As a result, a slip event could be well underway and have already adversely affected drivability before the hydraulic pressure is boosted to recover from the slip event. Additionally, the sum of all possible torques possibly seen within the transmission, including input torque from the engine, motor torque from an electric motor or a plurality of electric motors, and driveline torques, can still exceed a maximum achievable torque capacity available at a hydraulic systems highest pressure setting. An alternative method is disclosed whereby torques from various sources can be limited in response to a monitored clutch slip, such that slip events reaching a certain measured slip speed threshold initiates a clutch slip recovery event, wherein torques from the engine and from electric motors are reduced in order to facilitate the frictional forces within the clutch stopping or slowing to an acceptable level the clutch slip.

Managing output torque in order to maintain drivability is a priority in controlling a hybrid powertrain. Any change in torque in response to a change in output torque request applied through the transmission results in a change to the output torque transmitted to the driveline, thereby resulting in a change in propelling force to the vehicle and a change in vehicle acceleration. The change in torque request can come from operator input, such a pedal position relating an operator torque request, automatic control changes in the vehicle, such as cruise control or other control strategy, or engine changes in response to environmental conditions, such as a vehicle experiencing an uphill or downhill grade. By controlling changes to various input torques transmitted to a transmission within a hybrid powertrain, abrupt changes in vehicle acceleration can be controlled and minimized in order to reduce adverse effects to drivability.

As is known by one having ordinary skill in the art, any control system includes a reaction time. Changes to a powertrain operating point, comprising the speeds and torques of the various components to the powertrain required to achieve the desired vehicle operation, are driven by changes in control signals. These control signal changes act upon the various components to the powertrain and create reactions in each according to their respective reaction times. Applied to a hybrid powertrain, any change in control signals indicating a new torque request, for instance, as driven by a change in operator torque request or as required to execute a transmission shift, creates reactions in each affected torque generating device in order to execute the required changes to respective input torques. Changes to input torque supplied from an engine are controlled by an engine torque request setting the torque generated by the engine, as controlled, for example, through an ECM. Reaction time within an engine to changes in torque request to an engine is impacted by a number of factors well known in the art, and the particulars of a change to engine operation depend heavily on the particulars of the engine employed and the mode or modes of combustion being utilized. In many circumstances, the reaction time of an engine to changes in torque request will be the longest reaction time of the components to the hybrid drive system. Reaction time within an electric machine to changes in torque request include time to activate any necessary switches, relays, or other controls and time to energize or de-energize the electric machine with the change in applied electrical power.

Figure 3:
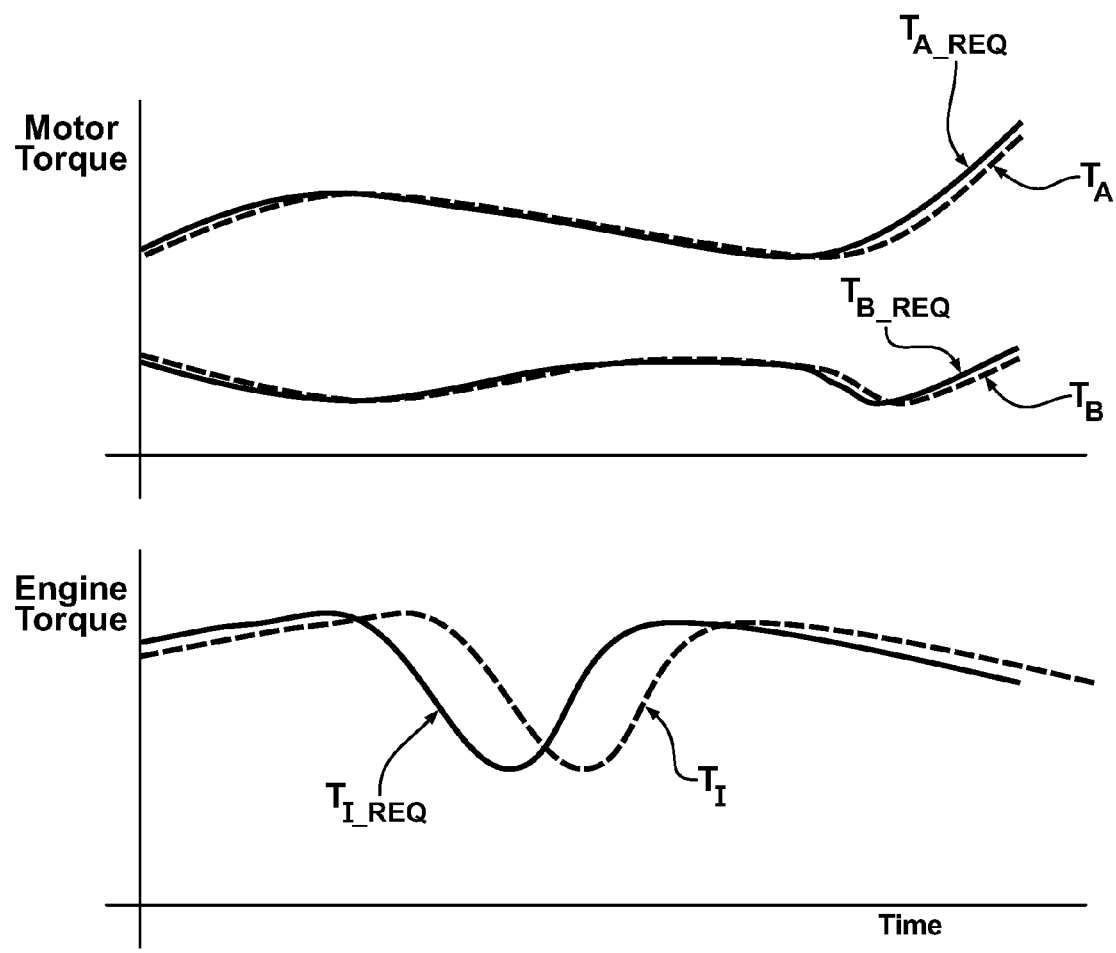
FIG. 3 graphically depicts reaction times of exemplary hybrid powertrain components to changes in torque request, in accordance with the present disclosure.

FIG. 3 graphically depicts reaction times of exemplary hybrid powertrain components to changes in torque request, in accordance with the present disclosure. Components to an exemplary hybrid powertrain system including an engine and two electric machines are exemplified. Torque requests and resulting changes in input torque produced by each torque generating device are illustrated. As described above, the data shows that electric machines quickly respond to changes in torque requests, whereas the engine follows changes in torque requests more slowly.

A method is disclosed wherein reactions times of the engine and of the electric machine or machines within a hybrid powertrain are utilized to control in parallel a lead immediate torque request, controlling the engine, and an immediate torque request, controlling the electric machines, the torque requests being coordinated by respective reaction times in order to substantially effect substantially contemporaneous changes to input torque.

Because, as discussed above, changes to input torque from the engine are known to involve consistently longer reactions times than changes to input torque from an electric machine, an exemplary embodiment of the disclosed method can implement changes in torque request to the engine and the electric machine, acting in parallel as described above, including a lead period to the more quickly reacting device, the electric motor. This lead period may be developed experimentally, empirically, predictively, through modeling or other techniques adequate to accurately predict engine and electric machine operation, and a multitude of lead periods might be used by the same hybrid powertrain, depending upon different engine settings, conditions, operating and ranges and vehicle conditions. An exemplary equation that can be used in conjunction with test data or estimates of device reaction times to calculate lead period in accordance with the present disclosure includes the following relationship.

$$T_{Lead} = T_{Lead\ Reaction} - T_{Immediate\ Reaction} \quad [1]$$

$T_{Lead}$ equals the lead period for use in methods described herein. This equation assumes that two torque producing devices are utilized. $T_{Lead\ Reaction}$ represents the reaction time of the device with the longer reaction time, and $T_{Immediate\ Reaction}$ represents the reaction time of the device with the shorter reaction time. If a different system is utilized, comprising for example an engine with a long lead period, a first electric machine with an intermediate lead period, and a second electric machine with a short lead period, lead periods can be developed comparing all of the torque generating devices. In this exemplary system, if all three torque generating devices are involved, two lead periods, one for the engine as compared to each of the electric machines, will be utilized to synchronize the responses in each of the devices. The same system at a different time might be operating with the engine off and disengaged from the transmission, and a lead period comparing the first electric machine and the second electric machine will be utilized to synchronize the responses in the two electric machines. In this way, a lead period can be developed coordinating reaction times between various torque generating devices.

One exemplary method to utilize lead periods to implement parallel torque requests to distinct torque generating devices in order to effect substantially simultaneous changes to output torque in response to a change in operator torque request includes issuing substantially immediately a change to the engine torque immediate request, initiating within the engine a change to a new engine output torque. This new engine output torque, in conjunction with the electric motor operating state, is still managed by the HCP in order to provide some portion of the total input torque to the transmission required to propel the vehicle. From the point that the engine torque immediate request changes, the lead period expires, described above taking into account the differences in reaction times between the engine and the electric machine. After the lead period, a change to torque requests issued to the electric machine or machines, managed by the HCP in order to fulfill a portion of the operator torque request, is executed, and the electric machine changes the electric machine operating state, and as described above, the changes to the input torques provided by the engine and the electric machine change substantially simultaneously.

One with ordinary skill in the art will also appreciate that an engine tends to react or change speed and torque relatively slowly in comparison to a control system, such as a hydraulic control system, changing clutch clamping pressure. Therefore, in a clutch control strategy limiting engine input torque to accommodate clutch capacity to minimize clutch slip and in order to maximize available engine input torque available to the vehicle, it is advantageous to limit engine torque only to the maximum achievable torque capacity and to modulate or increase clutch capacity as needed to utilize the engines full input torque. An increase in torque demanded of the engine can be met with a timely, corresponding increase to clutch capacity as needed up the maximum achievable torque capacity of the clutch.

Another contemplated method utilizes the estimated torque capacity curves to limit motor torque. One with ordinary skill in the art will appreciate that motor torque, in hybrid control strategies, can be used in a wide variety of functions, either individually, in parity with an engine, or acting in an opposite direction to the engine, the electric machines fulfilling a wide variety of functions. One with ordinary skill in the art will also appreciate that a motor tends to react or change speed and torque relatively quickly in comparison to a control system, such as a hydraulic control system, changing clutch clamping pressure. Therefore, in a clutch control strategy limiting motor torque to accommodate clutch capacity to minimize clutch slip and in order utilize the relative responsiveness of the motors to changing torque demands, it is advantageous to limit motor torque to the estimated torque capacity without modulating the clutch control system. In a vehicle utilizing the above mentioned exemplary clutch control strategies, engine and motor torques may be utilized within the physical limits of the clutch while taking advantage of the relative reaction speeds of the various hybrid drive components.

The aforementioned methods, limiting input torque from the engine and electric machine torques to corresponding estimated maximum or capacity clutch torques without causing clutch slip, are useful to control hybrid drive components, maximizing available torque available to the driveline while maintaining torque demand responsiveness by selecting a limiting strategy corresponding to the respective reactive speeds of the hybrid drive components. However, estimated maximum or capacity clutch torques and estimated reactive torques are calculations based upon available data and are not always accurate. As a result of deviations in actual vehicle conditions from conditions apparent in the available data, situations can occur where a clutch that is not expected to experience clutch slip does slip. As a result, the above mentioned clutch control strategies, intending to maintain the clutch in a locked state while attempting to take full advantage of the torque available from the various components of the hybrid drive system, can allow the clutch to slip.

A method is disclosed whereby additional limits are imposed upon input and motor torques in response to an indicated slip event, thereby lowering reactive torque transmitted through the clutch, so as to recover from the slip event and restore the clutch to a substantially locked state.

Figure 4:
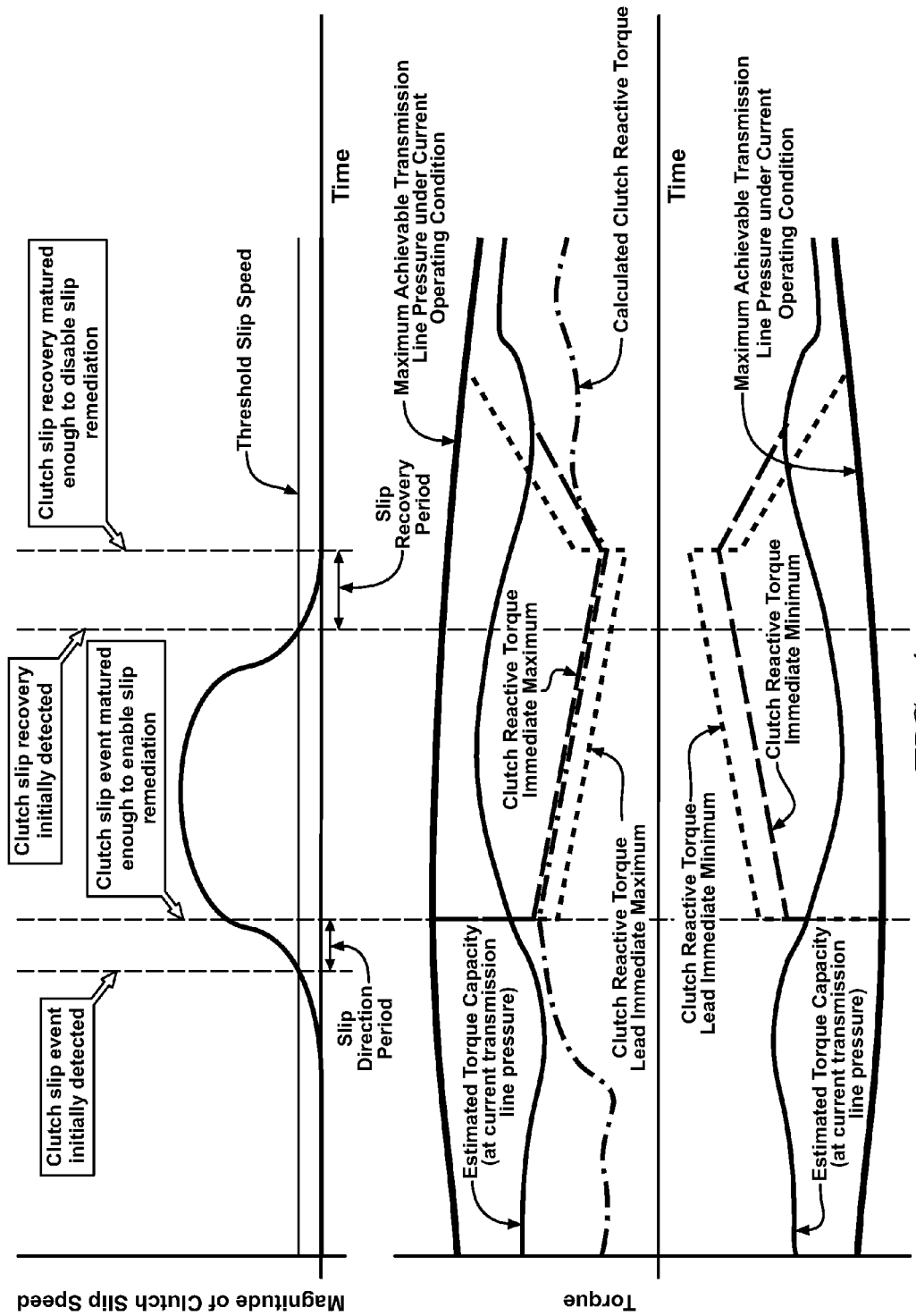
FIG. 4 is a graphical representation of an exemplary slip event and related torque expressions, in accordance with the present disclosure.

FIG. 4 is a graphical representation of a slip event and a corresponding clutch slip recovery event in accordance with the present disclosure. The two graphs depicted share a common timeline. The top graph depicts clutch slip speed, or relative rotational velocity between the connective surfaces of the clutch, with respect to time. A value of zero on the Y-axis corresponds to the clutch connective surfaces or clutch plates locked and exhibiting zero slip speed. Any value not equal to zero represents relative rotational movement between the clutch connective surfaces. The value is an absolute magnitude without respect to the direction of slip. The bottom graph depicts maximum torque (torque in one direction between the clutch connective surfaces, represented as a positive Y-axis value) and minimum torque (torque in the opposite direction between the clutch connective surfaces, represented as a negative Y-axis value) that might be transmitted through the clutch through the time span depicted. The uppermost and lowermost lines, represented by heavy solid lines, depict the maximum achievable torque capacity of the clutch if the clutch control mechanism were operated at its maximum settings under current vehicular conditions, for example, if a hydraulic control system is set to its maximum pressure setting. Within an exemplary hydraulic control system, one with ordinary skill in the art will appreciate that a main hydraulic pump may be operated at its highest setting or, in addition, an auxiliary hydraulic pump can be utilized to boost the hydraulic pressure available to supply clutch clamping force. The maximum achievable torque capacity represents a limit, both in the maximum and minimum ranges, that the clutch is capable of delivering, allowing for modulation of the clutch control system to achieve the maximum clamping pressure upon the clutch that the clutch control system is capable of producing. A set of lines, represented by the thin solid line, depict the estimated torque capacity ($T_{C\text{-}EST}$) with the clutch control mechanism operated at its current or an operational control setting without any modulation or boosting of clamping force. The calculated reactive clutch torque depicts the estimated actual torque presently transmitted through the clutch. The value of the actual torque transmitted through the clutch cannot be measured directly, so the value must be calculated or estimated from available data by methods well known in the art.

The maximum achievable torque capacity and $T_{C\text{-}EST}$ as described above represent limits to the ability of a clutch to transmit torque without slippage. These torque limits, mapping the capabilities of a clutch based upon estimated or calculated clutch capabilities, can be utilized in hybrid control strategies to facilitate hybrid drive operation, maximizing drivability by allowing operation of torque generating devices up to the estimated limits of clutch capabilities while maintaining system responsiveness to changes in torque commands. One contemplated method to be utilized in hybrid control strategies utilizes the maximum achievable torque capacity curves to impose limits upon input torque from the engine or from an electric machine.

As depicted in FIG. 4, the top graph shows measured clutch slip speed over a time span. Many methods are contemplated for evaluating slip speed, and the evaluation may use simple comparisons or complex algorithms, utilized within a processor, to evaluate data available indicating slip. One method to indicate a slip event includes monitoring a measured clutch slip speed and comparing the measured clutch slip speed to a threshold slip speed. Methods are known to directly measure slip speeds. Methods are also known to inferentially derive slip speeds on the basis of known properties of the transmission and known speeds. If the measured clutch slip speed exceeds the threshold slip speed, then a slip event is indicated. Initially, the measured clutch slip speed equals zero, indicating that the clutch is in a locked mode, with zero relative movement between the clutch connective surfaces. At some time, the measured clutch slip speed begins to increase, and eventually exceeds a threshold slip speed, indicating a clutch slip event. A slip remediation response, imposing limits upon input and motor torques to recover from the indicated slip, can be initiated immediately upon indication of a slip event. However, as described in the exemplary method depicted in FIG. 4, it can be beneficial to require slip in excess of the threshold slip speed for some slip detection period before initiating a remediation response to minimize the effects of false positive slip events. Once remediation response is initiated, two limits are imposed upon the hybrid drive system: a clutch reactive torque lead immediate maximum is imposed upon the input torque supplied by the engine and a clutch reactive torque immediate maximum is imposed upon the motor torques supplied by the electric motors. As aforementioned, the engine responds more slowly to changes in torque demands than other hybrid drive components such as the electric motors. As a result, in order to command a torque limit upon an engine and electric motors nearly simultaneously, the limit imposed upon the engine, as imposed by the clutch reactive torque lead immediate maximum, must be initiated in advance of the limit imposed upon the electric motors. Both torque limits are initially imposed based upon the calculated reactive torque as estimated at the initiation of the remediation response, and in order to insure the eventual recovery from slip event, the limits imposed upon the engine and the electric motors gradually increase, continually further limiting the torques available to the hybrid drive devices until the frictional forces applied within the clutch restore synchronization or near synchronization of the clutch. Many methods are contemplated for evaluating slip, as discussed above, and these methods can also be applied to terminating the remediation response. The exemplary method described above, comparing the measured clutch slip speed to the threshold slip speed, can be used in reverse to determine the end of a clutch slip event. Termination of the remediation response can be initiated immediately upon the measured clutch slip speed dropping below the threshold slip speed; however utilizing a slip recovery period before initiating the termination of remediation response has the further benefit of allowing the clutch connective surfaces within the clutch to substantially return to a locked state. As will be appreciated by one having ordinary skill in the art, friction coefficients between two objects are commonly given in static and kinetic coefficients. Two objects in stationary contact can usually transmit a greater force of friction between them than two similar objects in moving contact. As applied to clutches, in order to prevent a slipping event from re-expanding after a remediation response, it is beneficial to bring the clutch connective surfaces in a locked stated, creating stationary contact between the surfaces and increasing the torque which may be transmitted through the clutch without causing a slip event. Applied to the delay in initiating the termination of a remediation response as depicted in FIG. 4, such a delay encourages the clutch to return to a locked state before torque limits are relaxed in accordance with the termination of the remediation response. After the termination of the remediation response has been initiated, the limits imposed upon the engine and motor torques can be removed. The removal of these limits can be in a step fashion. However, such a sudden application of reactive torque to the clutch can cause reoccurrence of clutch slip, whereas a more gradual reapplication of reactive torque, as depicted in FIG. 4 where clutch reactive torque lead immediate maximum and the clutch reactive torque immediate maximum gradually slope back to normal values toward the right of the chart, can lessen the likelihood of the recurrence of slip.

The threshold slip speed as described in the above methods can be a simple value or may be variable depending upon vehicle conditions. The threshold slip speed can be developed experimentally, empirically, predictively, through modeling or other techniques adequate to accurately predict clutch operation. Further, the implementation of the clutch reactive torque lead immediate maximum and the clutch reactive torque immediate maximum with relation to the calculated reactive torque at the initiation of the remediation response, the rate at which these limits to the torques are increased through the remediation response, and the rate at which these limits are relaxed after the termination of the remediation response can also be developed experimentally, empirically, predictively, through modeling or other techniques adequate to accurately predict clutch and hybrid drive operation.

As previously disclosed in relation to FIG. 1, hybrid drive systems are frequently complex mechanisms with multiple clutches and one or more electrical machines in the form of electric motors, and these devices in combination with an engine can operate in various hybrid drive modes, where in the engine might be providing rotational power to one application, and each of the electrical motors could be providing rotational power to other and separate applications. As a result, the clutches of the transmission can serve multiple, changing, or distinct duties. For instance one clutch may bear the total torque of the hybrid drive system, for instance, pulling a heavy vehicle with a heavy towed load up a steep incline, using all torque providing devices in unison to drive the vehicle. Another clutch may only be activated to change the operating range state of the transmission according to programmed logic within a strategic control module. Reactive torques transmitted through each clutch can be simultaneously different or in transition. As a result of these possibly divergent applications of torque to the clutches, the control strategies disclosed herein can be applied to all clutches in the transmission, or the strategies can be applied to only a portion of the clutches. Additionally, torque limits can be selectively applied, where one electric motor being applied to one clutch can be limited, wherein another electric motor being applied to another clutch can remain unlimited.

Figure 5:
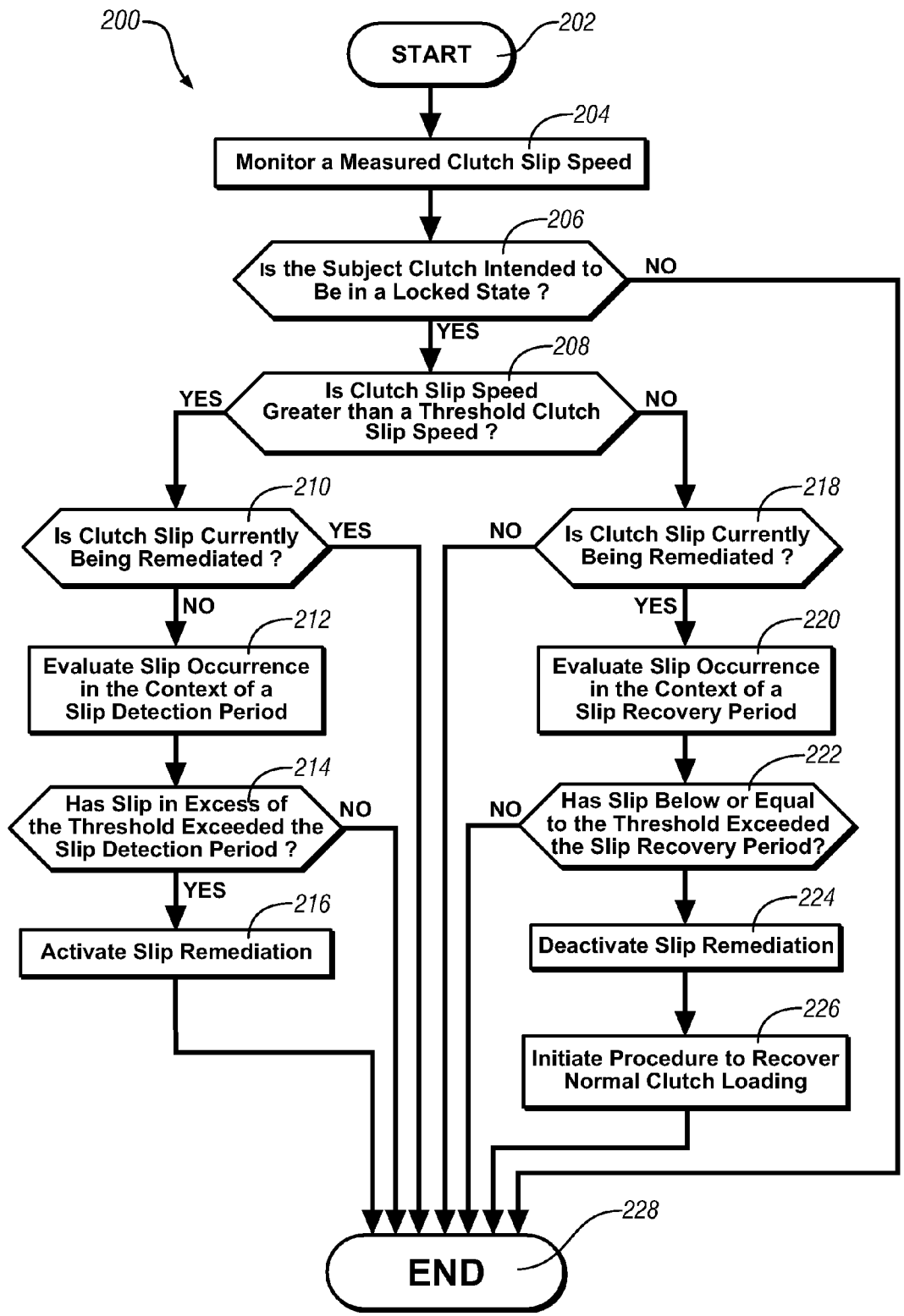
FIG. 5 is a flowchart representation of an exemplary process employing a method for slip remediation, in accordance with the present disclosure.

FIG. 5 illustrates an exemplary process whereby an exemplary slip remediation method can be utilized in accordance with the present disclosure. Process 200 represents a series of steps that can be started and then reiterated as part of a iterative control loop. The process begins at step 202. At step 204, a measured clutch slip speed is monitored. At step 206, the clutch being monitored is referenced with regard to its present control state. If the clutch is intended to be locked, wherein slip is an unintended condition affecting drivability, the process proceeds to step 208. If the clutch is intended to be in an unlocked state or transitioning through unlocking or locking states, then slip or relative rotational movement across the clutch is an intended condition, and the process proceeds to end at step 228. At step 208, the measured clutch slip speed is compared to a threshold slip speed, and if the measured clutch slip speed is greater than the threshold slip speed, then the process proceeds to step 210. If the measured clutch slip speed is not greater than the threshold slip speed, then the process proceeds to step 218. At step 210, an evaluation is made whether clutch slip is currently being remediated, and if it is, then the process proceeds to end at step 228. If clutch slip is not currently being remediated, then the process proceeds to step 212, where the occurrence of slip is evaluated in terms of a slip detection period. As described above, a slip detection period is essentially a delay, during which slip in excess of the threshold must exist, before slip remediation is initiated. At step 214, if slip in excess of the threshold has not occurred through a slip detection period, then the process proceeds to end at step 228. If slip has occurred through the slip detection period, then the process proceeds to step 216, whereat a slip remediation method is activated. The process then proceeds to end at step 228. In the alternative, if, at step 208, the measured clutch slip speed is not greater than the threshold slip speed, then the process proceeds to step 218, whereat an evaluation is made whether clutch slip is currently being remediated, and if it is not, then the process proceeds to end at step 228. If clutch slip is currently being remediated, then the process proceeds to step 220, where the occurrence of slip is evaluated in terms of a slip recovery period. At step 222, if slip not in excess of the threshold has not occurred through the slip recovery period, then the process proceeds to end at step 228. If slip not in excess of the threshold has occurred through a slip detection period, then the process proceeds to step 224, whereat a slip remediation method is activated. Additionally, at step 226, a procedure is initiated to recover the clutch to normal loading levels, as described in detail above. The process then proceeds to end at step 228. As mentioned above, process 200 describes a single iteration of an exemplary slip remediation method, and the process, as used in a vehicle, would be reiterated in a cycle, reevaluating slip and appropriate measures with each cycle.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is;

1. A method for operating a powertrain comprising an electro-mechanical transmission mechanically-operatively coupled to an internal combustion engine and an electric machine adapted to selectively transmit mechanical power to an output member, wherein a microprocessor performs the following steps:
    monitoring slip across a selectively applied clutch within said transmission to indicate a clutch slip event; and
    when said monitoring indicates said clutch slip event, initiating a slip remediation response comprising:
        imposing a limit upon a magnitude of torque permitted from said engine and a magnitude of torque permitted from said electric machine; and
        progressively reducing said magnitudes based upon said monitored slip indicating a continuing slip event, in order to reduce said slip, thereby ending said clutch slip event, including a delaying command to said electric machine in comparison to a command to said engine, anticipating response lag in said engine as compared to said electric machine, so as to effect said limit upon said engine and said electric machine torques with simultaneous torque reductions.

2. The method of claim 1, further comprising monitoring slip across a plurality of selectively applied clutches.

3. The method of claim 1, wherein said monitoring slip comprises comparing a measured clutch clip speed to a threshold slip speed and indicating said clutch slip event when said measured clutch slip speeds exceeds said threshold slip speed.

4. The method of claim 1, wherein said monitoring slip comprises comparing a measured clutch clip speed to a threshold slip speed and indicating said clutch slip event when said measured clutch slip speed exceeds said threshold slip speed throughout a slip detection period.

5. The method of claim 1, wherein initiating the slip remediation response further comprises imposing a limit upon a magnitude of torque permitted from a second electric machine.

6. The method of claim 1, wherein initiating said slip remediation response comprises:
    initially imposing said limit said magnitude of torque permitted from said engine to a magnitude of a calculated reactive clutch torque; and
    progressively reducing said magnitude of torque permitted from said engine.

7. The method of claim 1, wherein initiating said slip remediation response comprises:
    initially imposing said limit said magnitude of torque permitted from said electric machine to said magnitude of said calculated reactive clutch torque; and
    progressively reducing said magnitude of torque permitted from said electric machine.

8. The method of claim 1, further comprising removing said limit when said monitoring indicates an end to said clutch slip event.

9. The method of claim 8, wherein said monitoring indicating an end to said clutch slip event comprises comparing a measured clutch clip speed to a threshold slip speed and indicating said end to said clutch slip event when said measured clutch slip speed is less than said threshold slip speed.

10. The method of claim 9, wherein said monitoring indicating an end to said slip event comprises comparing a measured clutch clip speed to a threshold slip speed and indicating said end to said clutch slip event when said measured clutch slip speed is less than said threshold slip speed through a slip recovery period.

11. The method of claim 9, wherein removing said limit comprises:
    initially maintaining said magnitude of torque permitted; and
    progressively increasing said magnitude of torque permitted until said limit is entirely removed.

12. A method for operating a powertrain comprising an electro-mechanical transmission adapted to selectively transmit mechanical power to an output member through selective application of a plurality of clutches, wherein said transmission is mechanically-operatively coupled to an internal combustion engine and a plurality of electric motors, wherein a microprocessor performs the following steps:
    monitoring clutch slip across each selectively applied clutch; and
    when said monitoring indicates clutch slip in excess of a threshold clutch slip level through a slip detection period, initiating a slip remediation response comprising:
        limiting a magnitude of torque permitted from said engine transmitted through said clutches and limiting a magnitude of torque permitted from said electric motors transmitted through said clutches; and
        progressively reducing said magnitudes based upon said monitored clutch slip indicating a continuing slip event, in order to reduce said slip, thereby ending said clutch slip event.

13. The method of claim 12, wherein said limiting said magnitude of torque permitted from said electric motors includes a delay in comparison to said limiting a magnitude of torque permitted from said engine, anticipating response lag in said engine as compared to said electric machine, so as to effect both said limiting engine and electric motor torques simultaneously.

14. The method of claim 12, 
    wherein said limiting said magnitude of torque permitted from said engine comprises initially constraining said magnitude of torque permitted from said engine to a magnitude of a calculated clutch reactive torque; and wherein said limiting a magnitude of torque permitted from said electric motors comprises initially constraining said magnitude of torque permitted from said electric motors to said magnitude of said calculated clutch reactive torque.

15. Apparatus for operating a powertrain comprising an electro-mechanical transmission adapted to selectively transmit mechanical power to an output member through selective application of a plurality of clutches, wherein said transmission is mechanically-operatively coupled to an internal combustion engine and a plurality of electric machines, the apparatus comprising:

a control system monitoring slip across said clutches and including logic diagnosing a slip event in each clutch and imposing torque constraints upon said engine and said electric machines based upon said diagnosis, said constraints being effective to reduce a load upon said clutch and eliminate said excessive slip; and, as long as said slip event remains, logic progressively decreasing torque permitted from said engine and said electric machines in order to reduce said slip, thereby ending said slip event.

16. The apparatus of claim 15, wherein said logic imposing torque constraints upon said engine issues control commands comprising:

a command initially limiting a magnitude of torque permitted from said engine to a magnitude of a calculated clutch reactive torque.

17. The apparatus of claim 16, wherein said logic imposing torque constraints upon said electric machines issues control commands comprising:

a command initially limiting a magnitude of torque permitted from said electric machines to a magnitude of a calculated clutch reactive torque.

18. The apparatus of claim 16, wherein said logic diagnosing said slip event in each clutch further diagnoses an end to said slip event; and wherein said logic imposing torque constraints upon said engine and said electric machines based upon said diagnosis, upon diagnosing said end to said slip event, issues control commands comprising a command initially maintaining a load across said selectively applied clutch, and subsequent commands progressively increasing said load until a normal load across said clutch is achieved.

* * * * *